US010791022B2

(12) United States Patent
Blankenship et al.

(10) Patent No.: US 10,791,022 B2
(45) Date of Patent: Sep. 29, 2020

(54) LC-PDCCH REPETITION LEVEL SELECTION FOR MTC DEVICES

(71) Applicant: Telefonaktiebolaget LM Ericsson (publ), Stockholm (SE)

(72) Inventors: Yufei Blankenship, Kildeer, IL (US); Johan Bergman, Stockholm (SE); Asbjörn Grövlen, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 550 days.

(21) Appl. No.: 15/031,413

(22) PCT Filed: Apr. 11, 2016

(86) PCT No.: PCT/EP2016/057929
§ 371 (c)(1),
(2) Date: Apr. 22, 2016

(87) PCT Pub. No.: WO2016/162565
PCT Pub. Date: Oct. 13, 2016

(65) Prior Publication Data
US 2018/0198677 A1    Jul. 12, 2018

Related U.S. Application Data

(60) Provisional application No. 62/145,588, filed on Apr. 10, 2015.

(51) Int. Cl.
*H04L 12/24* (2006.01)
*H04L 5/00* (2006.01)
(Continued)

(52) U.S. Cl.
CPC ........ *H04L 41/0806* (2013.01); *H04L 5/0053* (2013.01); *H04W 72/042* (2013.01);
(Continued)

(58) Field of Classification Search
CPC ............ H04L 41/0806; H04W 72/042; H04W 72/044; H04W 76/27; H04W 88/08; H04W 88/02
See application file for complete search history.

(56) References Cited

U.S. PATENT DOCUMENTS 9,485,763 B2   11/2016  You et al.
2016/0192299 A1   6/2016  Chen
(Continued)

FOREIGN PATENT DOCUMENTS

JP    2016507176 A    3/2016
KR    20150034584 A   4/2015
(Continued)

OTHER PUBLICATIONS

Aris, U.S. Appl. No. 62/131,640 Downlink Control Channel Structure for Low Cost UEs, Mar. 2015.*
(Continued)

*Primary Examiner* — Ajit Patel
*Assistant Examiner* — Wilfred Thomas
(74) *Attorney, Agent, or Firm* — Coats + Bennett, PLLC

(57) ABSTRACT

There is provided mechanisms for configuring a UE. A base station is configured to configure the UE with a LC-PDCCH repetition level range selected from an ordered set of LC-PDCCH repetition level ranges using RRC signalling. The base station is configured to select a LC-PDCCH repetition level from the configured LC-PDCCH repetition level range for a transport block transmission to the UE. The UE is configured to receive the LC-PDCCH repetition level range as configuration information from the base station and using RRC signalling. The UE is configured to attempt decoding the LC-PDCCH according to at least one value in the configured LC-PDCCH repetition level range.

23 Claims, 8 Drawing Sheets

(51) Int. Cl.
*H04W 76/27* (2018.01)
*H04W 72/04* (2009.01)
*H04W 88/02* (2009.01)
*H04W 88/08* (2009.01)

(52) U.S. Cl.
CPC ......... *H04W 72/044* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2016/0234810 A1* | 8/2016 | Wong | H04W 48/12 |
| 2016/0242150 A1 | 8/2016 | Kang et al. | |
| 2016/0270038 A1* | 9/2016 | Papasakellariou | H04W 72/042 |
| 2016/0330723 A1* | 11/2016 | Gao | H04B 7/26 |
| 2016/0345300 A1* | 11/2016 | Kim | H04W 48/16 |
| 2016/0353420 A1 | 12/2016 | You et al. | |
| 2016/0360551 A1* | 12/2016 | Bergman | H04W 4/70 |
| 2017/0150477 A1* | 5/2017 | Du | H04W 68/02 |
| 2018/0103459 A1* | 4/2018 | Liu | H04W 72/042 |

FOREIGN PATENT DOCUMENTS

| | | |
|---|---|---|
| WO | 2014109621 A1 | 7/2014 |
| WO | 2015042856 A1 | 4/2015 |
| WO | 2015045079 A1 | 3/2017 |

OTHER PUBLICATIONS

Bergman, U.S. Appl. No. 62/109,350 PDCCH Initialization for MTC Devices, Jan. 2015.*
Eriksson, et al., "New WI proposal: Further LTE Physical Layer Enhancements for MTC", 3GPP TSG RAN Meeting #65, Edinburgh, Scotland, Sep. 9, 2014, pp. 1-9, 3GPP.
3rd Generation Partnership Project, "3rd Generation Partnership Project; Technical Specification Group Radio Access Network; Evolved Universal Terrestrial Radio Access (E-UTRA); Physical channels and modulation (Release 12)", Technical Specification, 3GPP TS 36.211 V12.4.0, Dec. 1, 2014, pp. 1-124, 3GPP, France.
3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.4.0, Dec. 1, 2014, pp. 1-225, 3GPP, France.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.4.1, Dec. 1, 2014, pp. 1-410, 3GPP, France.
3rd Generation Partnership Project, "3rd Generation Partnership Project; Technical Specification Group Radio Access Network; Study on provision of low-cost Machine-Type Communications (MTC) User Equipments (UEs) based on LTE (Release 12)", Technical Report, 3GPP TR 36.888 V12.0.0, Jun. 1, 2013, pp. 1-55, 3GPP, France.
Mediatek Inc., "Discussions on downlink control channel for Rel-13 MTC UE", 3GPP TSG RAN WG1 Meeting #80, Athens, Greece, Feb. 9, 2015, pp. 1-3, R1-150674, 3GPP.
Mediatek Inc., "Analysis on (E)PDCCH search space design in coverage enhancement mode", 3GPP TSG-RAN WG1 #76, Prague, Czech Republic, Feb. 10, 2014, pp. 1-5, R1-140240, 3GPP.
MCC Support, "Final Report of 3GPP TSG RAN WG1 #76 v1.0.0", 3GPP TSG RAN WG1 Meeting #76bis, Shenzhen, China, Mar. 31, 2014, pp. 1-115, R1-141730, 3GPP.
Alcatel-Lucent et al., "Considerations on RACH for Rel-13 LC UE", 3GPP TSG-RAN WG2 Meeting #89, Athens, Greece, Feb. 9, 2015, pp. 1-5, R2-150404, 3GPP.
Intel Corporation, "Discovery monitoring operation", 3GPP TSG-RAN WG2 #87 bis, Oct. 6-10, 2014, pp. 1-3, Shanghai, China, R2-144162.
Nokia Networkds et al., "Physical Downlink Control Channel for MTC", 3GPP TSG-RAN WG1 Meeting #80, Feb. 9-13, 2015, pp. 1-4, Athens, Greece, R1-150257.
Renesas Mobile Europe Ltd., "Details of PRB configuration for EPDCCH sets", 3GPP TSG-RAN WG1 Meeting #71, Nov. 13-16, 2012, pp. 1-4, New Orleans, US, R1-125055.
Mediatek Inc., "Analysis of (E)PDCCH enhancements and timing relationship with PDSCH", 3GPP TSG-RAN WG1 #74b, Oct. 7-11, 2013, pp. 1-4, Guangzhou, P.R. China, R1-134444.
Mediatek Inc., "Discussion on CSI report in coverage enhancement", 3GPP TSG-RAN WG1 #76, Feb. 10-14, 2014, pp. 1-3, Prague, Czech Republic, R1-140241.
Ericsson, "EPDCCH aggregation and repetition for MTC", 3GPP TSG RAN WG1 Meeting #80bis, Apr. 20-24, 2015, pp. 1-4, Belgrade, Serbia, R1-151212.
Panasonic, "Consideration on data channel and associated control channel for MTC", 3GPP TSG RAN WG1 Meeting #80, Feb. 9-13, 2015, pp. 1-5, Athens, Greece, R1-150306.
Nec, "Further details of Physical Downlink Control Channel for MTC", 3GPP TSG RAN WG1 Meeting #80, Feb. 9-13, 2015, pp. 1-5, Athens, Greece, R1-150284.

* cited by examiner

LC-PDCCH REPETITION LEVEL SELECTION FOR MTC DEVICES

TECHNICAL FIELD

Embodiments presented herein particularly relate to methods, a base station, a user equipment, computer programs, and a computer program product for configuration of the user equipment. The present inventive concept relates generally to wireless communications, and in particular to downlink configuration for machine-type communications.

BACKGROUND

LTE uses OFDM in the downlink and DFT-spread OFDM (or SC-FDMA) in the uplink. The basic LTE downlink physical resource can thus be seen as a time-frequency grid as illustrated in FIG. 1, where each resource element corresponds to one OFDM subcarrier during one OFDM symbol interval.

MTC

Machine-Type Communications (MTC) is an important revenue stream for operators and has a huge potential from the operator perspective. It is efficient for operators to be able to serve MTC UEs using already deployed radio access technology. Therefore 3GPP LTE has been investigated as a competitive radio access technology for efficient support of MTC. Lowering the cost of MTC UEs is an important enabler for implementation of the concept of "Internet of Things". Many MTC applications will require low operational UE power consumption and are expected to communicate with infrequent small burst transmissions. In addition, there is a substantial market for the M2M use cases of devices deployed deep inside buildings which would require coverage enhancement in comparison to the defined LTE cell coverage footprint.

3GPP LTE Rel-12 has defined UE power saving mode allowing long battery lifetime and a new UE category allowing reduced modem complexity. In Rel-13, further MTC work is expected to further reduce UE cost and provide coverage enhancement [4]. The key element to enable cost reduction is to introduce reduced UE RF bandwidth of 1.4 MHz in downlink and uplink within any system bandwidth [4].

EPDCCH

For normal UEs, the UE can be configured to monitor EPDCCH in addition to PDCCH [1][2].

For each serving cell, higher layer signalling can configure a UE with one or to two EPDCCH-PRB-sets for EPDCCH monitoring. Each EPDCCH-PRB-set consists of set of Enhanced Control Channel Elements (ECCE) numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signalling for control information, where monitoring implies attempting to decode each of the EPDCCHs in the set according to the monitored DCI format.

The set of EPDCCH candidates to monitor are defined in terms of EPDCCH UE-specific search spaces.

For each serving cell, the subframes in which the UE monitors EPDCCH UE-specific search spaces are configured by higher layers [3].

The existing PDCCH and EPDCCH search space is only defined for a single subframe. The search space that a UE monitors is also fixed and not configurable according to the operating scenario the UE experiences.

However, Rel-13 MTC UE needs a search space definition that includes the number of repetitions in time. The MTC UE also encompasses a wide range of operating conditions including low-cost UE versus normal-cost UE, normal-coverage vs enhanced-coverage with various degree of enhancement. Thus new search space definition is necessary for Rel-13 MTC operation.

The Background section of this document is provided to place embodiments of the present inventive concept in technological and operational context, to assist those of skill in the art in understanding their scope and utility. Unless explicitly identified as such, no statement herein is admitted to be prior art merely by its inclusion in the Background section.

SUMMARY

An object of embodiments herein is to provide efficient configuration of a UE.

According to one or more embodiments described and claimed herein, the following features are provided:

A system, methods, devices, and computer program products to define LC-PDCCH search space which includes number of repetitions in time;

A system, methods, devices, and computer program products to configure the LC-PDCCH search space that the UE monitors via higher layer signaling; and A system, methods, devices, and computer program products to define fallback mechanism so that the fallback search space is monitored periodically by the UE.

According to a first aspect there is presented a method for configuring a UE. The method is performed by a base station. The method comprises configuring the UE with a LC-PDCCH repetition level range selected from an ordered set of LC-PDCCH repetition level ranges using RRC signalling. The method comprises selecting a LC-PDCCH repetition level from the configured LC-PDCCH repetition level range for a transport block transmission to the UE.

According to a second aspect there is presented a base station for configuring a UE. The base station comprises a processor. The processor is configured to cause the base station to configure the UE with a LC-PDCCH repetition level range selected from an ordered set of LC-PDCCH repetition level ranges using RRC signalling. The processor is configured to cause the base station to select a LC-PDCCH repetition level from the configured LC-PDCCH repetition level range for a transport block transmission to the UE.

According to a third aspect there is presented a base station for configuring a UE. The base station comprises a configure module configured to configure the UE with a LC-PDCCH repetition level range selected from an ordered set of LC-PDCCH repetition level ranges using RRC signalling. The base station comprises a select module configured to select a LC-PDCCH repetition level from the configured LC-PDCCH repetition level range for a transport block transmission to the UE.

According to a fourth aspect there is presented a base station for configuring a UE. The base station comprises a processor and a computer program product. The computer program product stores instructions that, when executed by the processor, causes the base station to perform steps, or operations. The steps, or operations, cause the base station to configure the UE with a LC-PDCCH repetition level range selected from an ordered set of LC-PDCCH repetition level ranges using RRC signalling. The steps, or operations, cause the base station to select a LC-PDCCH repetition level from the configured LC-PDCCH repetition level range for a transport block transmission to the UE.

According to a fifth aspect there is presented a computer program for configuring a UE, the computer program comprising computer program code which, when run on a processor of a base station, causes the base station to perform a method according to the first aspect.

According to a sixth aspect there is presented a method for obtaining configuration of a UE. The method is performed by the UE. The method comprises receiving configuration information for a LC-PDCCH repetition level range selected from an ordered set of LC-PDCCH repetition level ranges using RRC signalling from a base station. The method comprises attempting decoding the LC-PDCCH according to at least one value in the configured LC-PDCCH repetition level range.

According to an seventh aspect there is presented a UE for obtaining configuration. The UE comprises a processor. The processor is configured to cause the UE to receive configuration information for a LC-PDCCH repetition level range selected from an ordered set of LC-PDCCH repetition level ranges using RRC signalling from a base station. The processor is configured to cause the UE to attempt decoding the LC-PDCCH according to at least one value in the configured LC-PDCCH repetition level range.

According to a eighth aspect there is presented a UE for obtaining configuration. The UE comprises a receive module configured to receive configuration information for a LC-PDCCH repetition level range selected from an ordered set of LC-PDCCH repetition level ranges using RRC signalling from a base station. The UE comprises a decode module configured to attempt decoding the LC-PDCCH according to at least one value in the configured LC-PDCCH repetition level range.

According to a ninth aspect there is presented a UE for obtaining configuration. The UE comprises a processor and a computer program product. The computer program product stores instructions that, when executed by the processor, causes the UE to perform steps, or operations. The steps, or operations, cause the UE to receive configuration information for a LC-PDCCH repetition level range selected from an ordered set of LC-PDCCH repetition level ranges using RRC signalling from a base station. The steps, or operations, cause the UE to attempt decoding the LC-PDCCH according to at least one value in the configured LC-PDCCH repetition level range.

According to an tenth aspect there is presented a computer program for obtaining configuration, the computer program comprising computer program code which, when run on a processor of the UE, causes the UE to perform a method according to the sixth aspect.

According to a eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

According to a twelfth aspect there is presented a system for configuring a UE. The system comprises the UE and a base station. The base station is configured to configure the UE with a LC-PDCCH repetition level range selected from an ordered set of LC-PDCCH repetition level ranges using RRC signalling. The base station is configured to select a LC-PDCCH repetition level from the configured LC-PD-CCH repetition level range for a transport block transmission to the UE. The UE is configured to receive the LC-PDCCH repetition level range as configuration information from the base station and using RRC signalling. The UE is configured to attempt decoding the LC-PDCCH according to at least one value in the configured LC-PDCCH repetition level range.

Advantageously these methods, these base stations, these UEs, this systems, and these computer programs provides efficient configuration of the UE.

Embodiments of the present inventive concept present numerous advantages over the prior art. The methods allow a narrow-band MTC UE to operate in a legacy LTE system with wider system bandwidth, and be able to obtain configuration of LC-PDCCH at the initialization stage.

It is to be noted that any feature of the first, second, third, fourth, fifth, sixth seventh, eight, ninth, tenth, eleventh, and twelfth aspects may be applied to any other aspect, wherever appropriate. Likewise, any advantage of the first aspect may equally apply to the second, third, fourth, fifth, sixth, seventh, eight, ninth, tenth, eleventh, and/or twelfth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

For simplicity and illustrative purposes, the present inventive concept is described by referring mainly to an exemplary embodiment thereof. In the following description, numerous specific details are set forth in order to provide a thorough understanding of the present inventive concept. However, it will be readily apparent to one of ordinary skill in the art that the present inventive concept may be practiced without limitation to these specific details. In this description, well known methods and structures have not been described in detail so as not to unnecessarily obscure the present inventive concept.

In the following, LC-PDCCH refers to the physical downlink control channel defined to support the reduced bandwidth low-complexity UE [4].

Alternative names of LC-PDCCH are MPDCCH in eMTC and NPDCCH in NB-IoT. Hence, the terms LC-PDCCH, MPDCCH, and NPDCCH are regarded as equivalents.

Note that while the low-complexity UE is used as an example, design of this channel can be utilized by other types of UEs as well. LC-PDCCH can be introduced as an alternative physical downlink control channel or as an alternative form of EPDCCH. In the following, "UE" refers to low-complexity UE [4] unless indicated otherwise.

Figure 7:
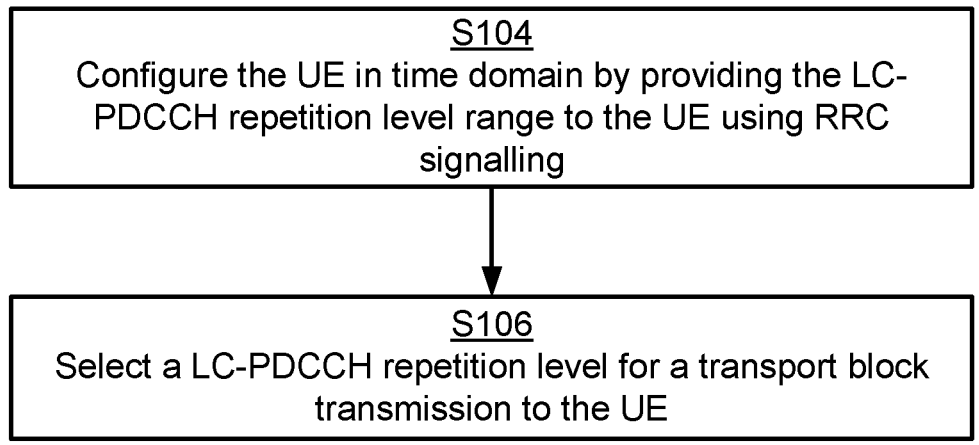
FIGS. 7, 8, 9, and to are flowcharts of methods according to embodiments.

Reference is now made to FIG. 7 illustrating a method for configuring a UE 30 as performed by the base station 10 according to an embodiment.

S104: The base station 10 configures the UE 30 with a LC-PDCCH repetition level range. The LC-PDCCH repetition level range is selected from an ordered set of LC-PDCCH repetition level ranges. The base station 10 configures the UE 30 using RRC signalling. The configuration of the UE 30 with a LC-PDCCH repetition level range can be regarded as configuring the UE 30 in time domain (see, Time Domain Resource Allocation for LC-PDCCH).

S106: The base station selects a LC-PDCCH repetition level from the configured LC-PDCCH repetition level range for a transport block transmission to the UE 30.

Embodiments relating to further details of configuring a UE 30 as performed by the base station 10 will now be disclosed.

Figure 8:
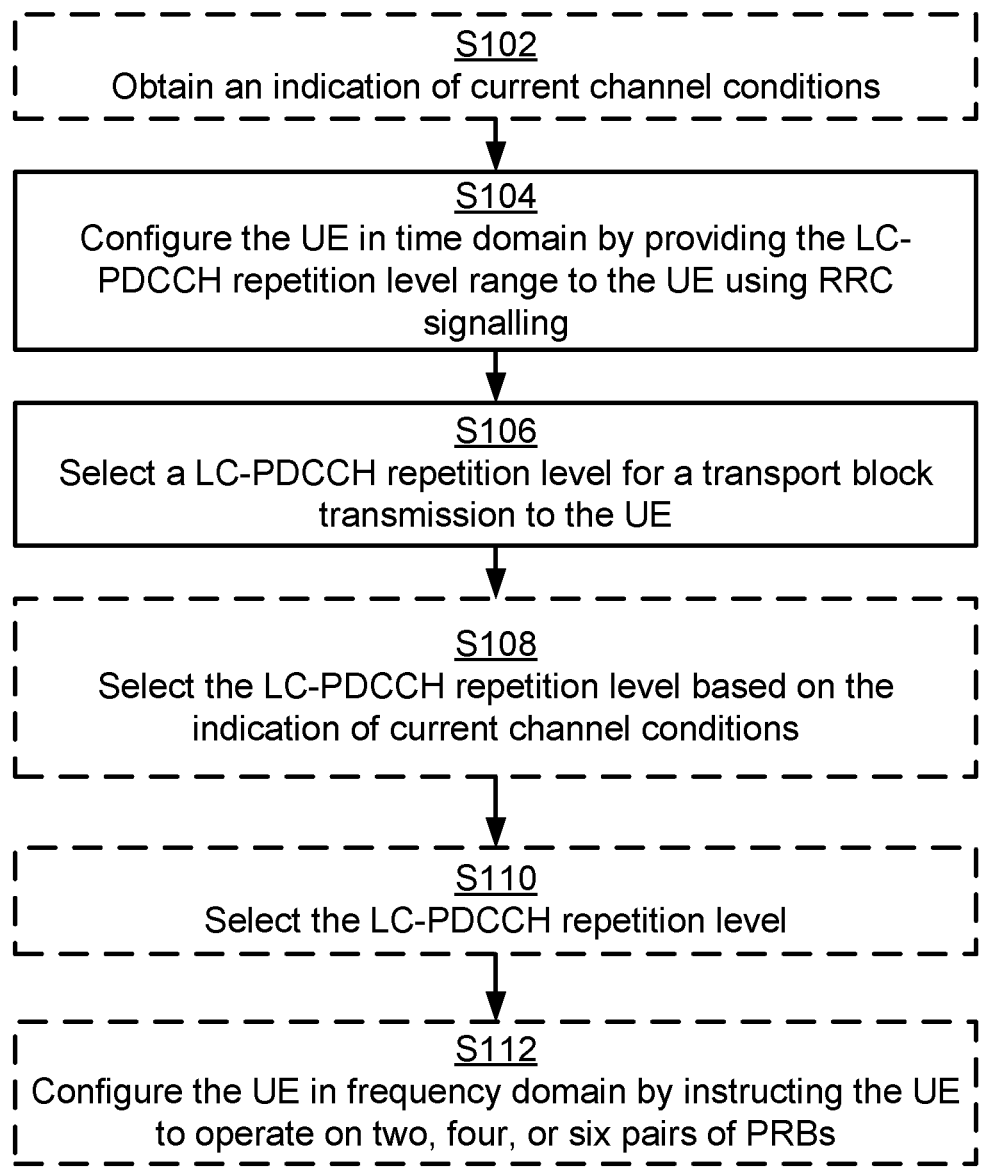

Reference is now made to FIG. 8 illustrating methods for configuring a UE 30 as performed by the base station 10 according to further embodiments. It is assumed that steps S104 and S106 are performed as disclosed above and a thus repeated description thereof is therefore omitted.

There can be different ways to define the set of LC-PDCCH repetition level ranges. According to an embodiment adjacent LC-PDCCH repetition level ranges in the set of LC-PDCCH repetition level ranges are partly overlapping.

According to some aspects the base station 10 is configured to configure the UE 30 in frequency domain, as in step S112:

S112: The base station 10 configures the UE 30 in frequency domain by instructing the UE 30 to operate on two, four, or six pairs of PRBs within a group of 6 PRBs in a subframe of the LC-PDCCH.

According to some aspects at most 2 bits are used to indicate the PRB location of a LC-PDCCH-PRB-set. Hence, according to an embodiment location of the PRBs within the group is indicated in the configuration by at most 2 bits.

There can be different ways for the base station 10 to select the set of LC-PDCCH repetition level. According to some aspect the base station 10 is configured to configure the UE 30 with a search space (as defined by the time domain configuration and optionally the frequency domain configuration) comprising several candidates for the number of repetitions (where these candidates are defined by the values in the configured LC-PDCCH repetition level range). The base station 10 can then be configured to have the UE 30 try these candidates (by the UE 30 being configured to attempt decoding of the values in the configured LC-PDCCH repetition level rang), and then dynamically select which one of these candidates it wants to use (e.g., by receiving information of the attempted decoding made by the UE 30).

These and further aspects of configuration of the UE 30 in frequency domain will be disclosed below (see, Frequency Domain Resource Allocation for LC-PDCCH).

There can be different ways for the base station 10 to act when configuring the UE in both time domain and frequency domain, hence providing the search space definition for the LC-PDCCH to the UE 30. As will be disclosed in more detail below (see, Search Space Definition for LC-PDCCH), the base station 10 could be configured to configure the LC-PDCCH repetition level range (i.e., to configure the UE 30 in time domain) and to configure the UE 30 in frequency domain either separately and independently or jointly.

Different aspects of fallback mechanisms (see, Fallback) will be described in more detail below. According to a first fallback mechanism the base station 10 is configured to perform step S102 and step S108:

S102: The base station 10 obtains an indication of current channel conditions. The current channel conditions correspond to an LC-PDCCH repetition threshold level.

S108: The base station 10 selects the LC-PDCCH repetition level based on the indication of current channel conditions such that the LC-PDCCH repetition level is higher than the LC-PDCCH repetition threshold level.

Step S108 can be performed as part of step S106.

According to a second fallback mechanism the base station 10 is configured to perform step S110:

S108: The base station 10 selects the LC-PDCCH repetition level such that the LC-PDCCH repetition level involves a first period comprising a first number of repetitions and a second period comprising a second number of repetitions. The repetitions in the second period are more densely placed than in the first period.

Step S110 can be performed as part of step S106.

Figure 9:
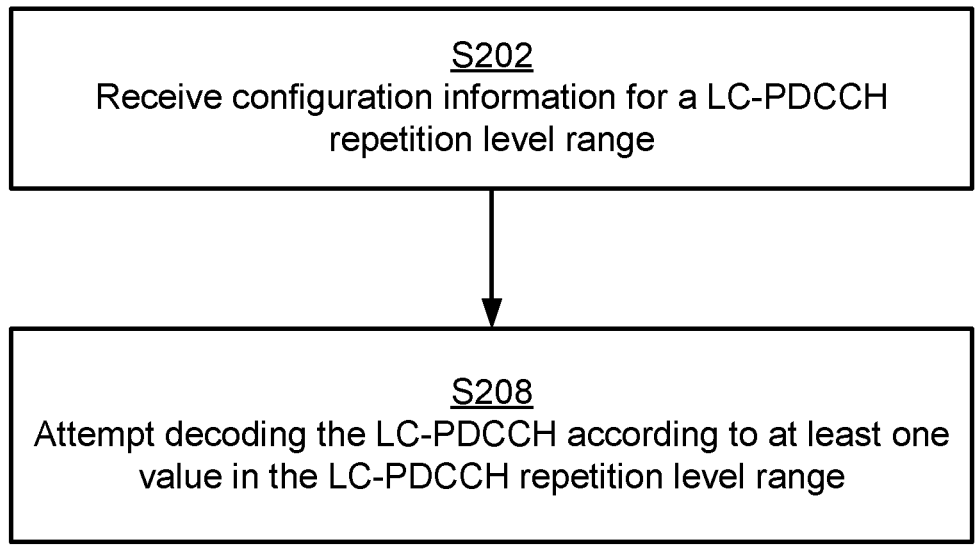

Reference is now made to FIG. 9 illustrating a method for obtaining configuration as performed by the UE 30 according to an embodiment.

S202: The UE 30 receives configuration information for a LC-PDCCH repetition level range. The LC-PDCCH repetition level range is selected from an ordered set of LC-PDCCH repetition level ranges. The configuration information is received using RRC signalling and from the base station 10. The configuration of the UE 30 with a LC-PDCCH repetition level range can be regarded as configuring the UE 30 in time domain (see, Time Domain Resource Allocation for LC-PDCCH).

S208: The UE 30 attempts decoding the LC-PDCCH according to at least one value in the configured LC-PDCCH repetition level range.

Embodiments relating to further details of obtaining configuration as performed by the UE 30 will now be disclosed.

Figure 10:
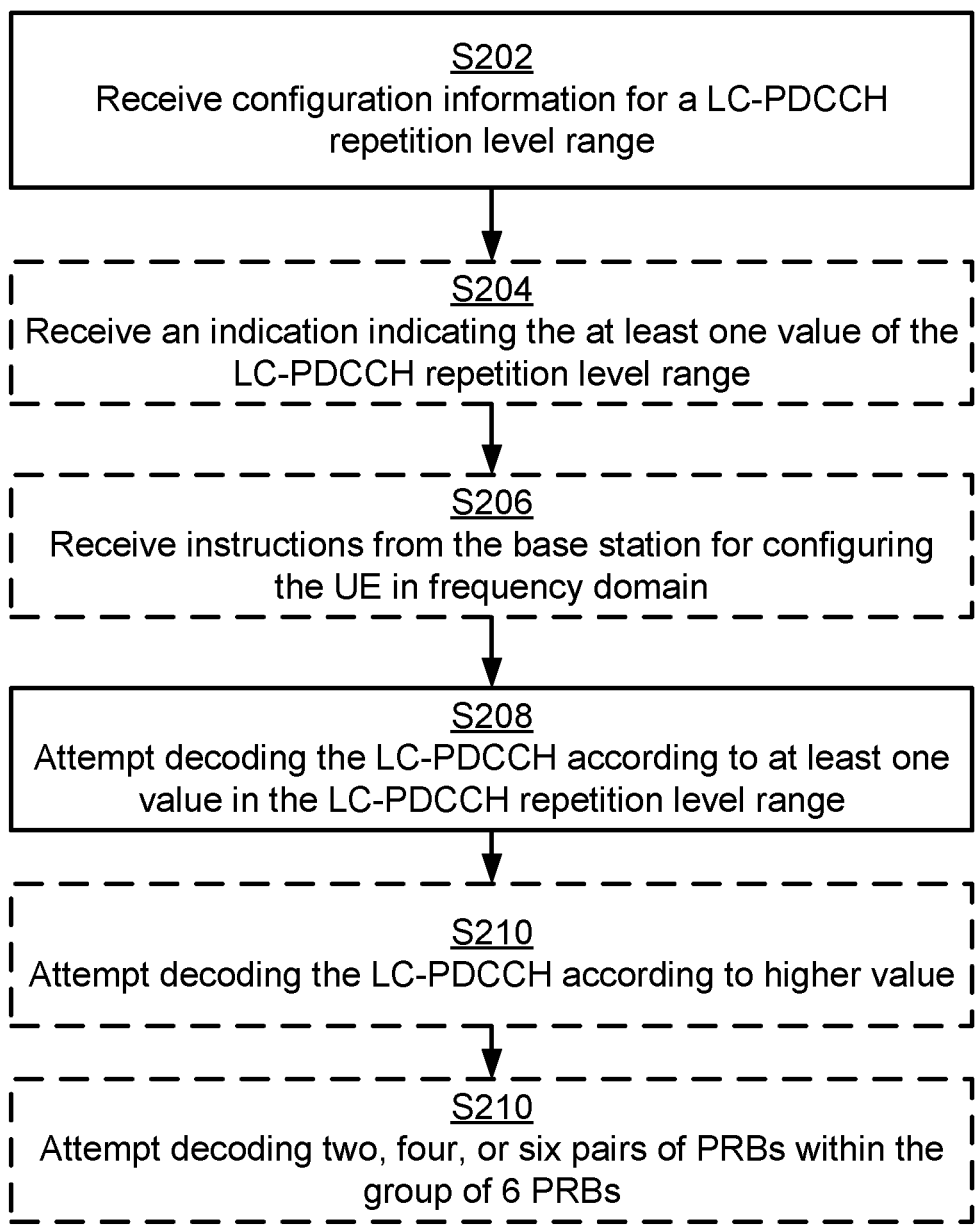

Reference is now made to FIG. 10 illustrating methods for obtaining configuration as performed by the UE 30 according to further embodiments. It is assumed that steps S202 and S208 are performed as disclosed above and a thus repeated description thereof is therefore omitted.

There can be different ways for the UE 30 to act when the attempted decoding was unsuccessful. There could be at least one higher value in the configured LC-PDCCH repetition level range. According to an embodiment the UE 30 is therefore configured to perform step S210:

S210: The UE 30 attempts decoding the LC-PDCCH according to at least one of the at least one higher value in the LC-PDCCH repetition level range.

There can be different ways for the UE 30 to determine which value, or values, in the configured LC-PDCCH repetition level range to attempt decoding. According to an embodiment the UE 30 is configured to receive such information from the vase station 10, by being configured to perform step S204:

S204: The UE 30 receives an indication indicating the at least one value of the LC-PDCCH repetition level range.

As disclosed above, according to some aspects the base station 10 is configured to configure the UE 30 in frequency domain. Hence, according to an embodiment the UE 30 is configured to receive such configuration in frequency domain by performing step S206 and S208:

S206: The UE 30 receives instructions from the base station 10 for configuring the UE 30 in frequency domain. The instructions instruct the UE 30 to operate on two, four, or six pairs of PRBs within a group of 6 PRBs in a subframe of the LC-PDCCH.

S208: the UE 30 attempts decoding two, four, or six pairs of PRBs within the group of 6 PRBs in a subframe of the LC-PDCCH according to the instructions.

Further aspects of configuration of the UE 30 in frequency domain will be disclosed below (see, Frequency Domain Resource Allocation for LC-PDCCH).

Embodiments disclosed above with reference to the base station 10 generally apply also to apply to the UE 30, mutatis mutandis.

For example, as disclosed above, there can be different ways to define the set of LC-PDCCH repetition level ranges. According to an embodiment adjacent LC-PDCCH repetition level ranges in the set of LC-PDCCH repetition level ranges are partly overlapping.

For example, as disclosed above, according to some aspects at most 2 bits are used to indicate the PRB location of a LC-PDCCH-PRB-set. Hence, according to an embodiment location of the PRBs within the group is indicated in the configuration by at most 2 bits.

For example, as disclosed above, according to an embodiment the LC-PDCCH repetition level involves a first period comprising a first number of repetitions and a second period comprising a second number of repetitions, and wherein the repetitions in the second period are more densely placed than in the first period.

Detailed embodiments relating to at least some of the embodiments presented above will now be disclosed. The below detailed embodiments apply equally well to the base station 10 and the UE 30.

Frequency Domain Resource Allocation for LC-PDCCH

For each serving cell, higher layer signalling can configure a UE with one or two LC-PDCCH-PRB-sets for LC-PDCCH monitoring. For each LC-PDCCH-PRB-pair set p, the UE is configured with a higher layer parameter resource-BlockAssignment-r13 indicating a combinatorial index r corresponding to the PRB index $$\{k_i\}_{i=0}^{N_{RB}^{X_p}-1},$$

$(1 \leq k_i \leq N_{RB}^{DL}, k_i < k_{i+1})$ and given by equation $$r = \sum_{i=0}^{N_{RB}^{X_p}-1} \binom{N_{RB}^{DL} - k_i}{N_{RB}^{X_p} - i},$$

where $N_{RB}^{DL}=6$ is the number of PRB pairs associated with the downlink bandwidth, $N_{RB}^{X_p}$ is the number of PRB-pairs constituting LC-PDCCH-PRB-set p, and is configured by the higher layer parameter numberPRBPairs-r13, and $$\binom{x}{y} = \begin{cases} \binom{x}{y} & x \geq y \\ 0 & x < y \end{cases}$$

is the extended binomial coefficient, resulting in unique label $$r \in \left\{0, \ldots, \binom{N_{RB}^{DL}}{N_{RB}^{X_p}} - 1\right\}.$$

The MTC UE is configured to operate within a 6-PRB group, $N_{RB}^{DL}=6$. The set of PRBs of LC-PDCCH is thus modified to consist of two, four, or six PRB pairs.

$$N_{RB}^{X_p} = 2, M = \left\lceil \log_2\left(\binom{N_{RB}^{DL}}{N_{RB}^{X_p}}\right) \right\rceil = \left\lceil \log_2\left(\binom{6}{2}\right) \right\rceil = 4 \text{ bits};$$

$$N_{RB}^{X_p} = 4, M = \left\lceil \log_2\left(\binom{N_{RB}^{DL}}{N_{RB}^{X_p}}\right) \right\rceil = \left\lceil \log_2\left(\binom{6}{4}\right) \right\rceil = 4 \text{ bits};$$

$$N_{RB}^{X_p} = 6, M = \left\lceil \log_2\left(\binom{N_{RB}^{DL}}{N_{RB}^{X_p}}\right) \right\rceil = \left\lceil \log_2\left(\binom{6}{6}\right) \right\rceil = 0 \text{ bits};$$

In other words, if the LC-PDCCH is to fully occupy the 6-PRB, then there is no need to indicate the RB resource allocation.

If it is not necessary to have full flexibility in defining the RBs in a set, then it is possible to use fewer bits in the LC-PDCCH-PRB-sets definition. For example:

For $N_{RB}^{X_p}=2$, if only 3 possibilities are defined, then only 2 bits are necessary to indicate the PRB location of a LC-PDCCH-PRB-set. A simple example of the PRB resource possibilities is: (a) PRBs {#0, #1}, (b) PRBs {#2, #3}, (c) PRBs {#4, #5}.

For $N_{RB}^{X_p}=4$, if only 3 possibilities are defined, then only 2 bits are necessary to indicate the PRB location of a LC-PDCCH-PRB-set. A simple example of the PRB resources possibilities is: (a) PRBs {#0, #1, #2, #3}, (b) PRBs {#0, #1, #4, #5}, (c) PRBs {#2, #3, #4, #5}.

Using the above PRB sets, then each $N_{RB}^{X_p}=2$ set has a complementary $N_{RB}^{X_p}=4$ set.

In addition to set sizes of {2, 4, 6}, it is also useful to define LC-PDCCH PRB set of size 3, such that two LC-PDCCH PRB sets can each take half of the 6-PRB group. In this case, only 1 bit is necessary to indicate the two possibilities of (a) PRBs {#0, #1, #2}, and (b) PRBs {#3, #4, #5}.

In legacy LC-PDCCH definition in LTE Release 11 and onwards, up to 16 blind decoding candidates are defined with a varying number of aggregation levels L.

For MTC UE, the overall aggregation level has both time and frequency dimensions. As discussed below, in some RRC configurations there are 4 possibilities allowed in time domain in terms of 4 possible number of repetitions of LC-PDCCH, e.g., N_rep_set(2)-N_rep_set(7) below. If it is desired to keep the number of UE-specific search space blind decoding candidates the same as before, i.e., 16, then in the frequency domain, there should be at most 4 possibilities within a subframe.

In the legacy EPDCCH definition, up to two EPDCCH-PRB-sets can be defined, where each EPDCCH-PRB-set can be localized or distributed. For Rel-13 MTC UE, since at most 6-PRB is available for LC-PDCCH transmission, there is unlikely to be substantial frequency selectivity to exploit. Thus the possible LC-PDCCH configurations may be reduced compared to EPDCCH configurations. In one example, either localized or distributed is configured for LC-PDCCH via RRC signaling, but not defining to one localized PRB set and one distributed PRB set simultaneously.

Time Domain Resource Allocation for LC-PDCCH

For a given transport block transmission, LC-PDCCH repetition level is a variable chosen by the base station 10 from a set of values in the aggregation level (AL). RRC signal configures the range of repetition levels the UE assume in the search space.

Example:
N_rep_set(0)={1} number of repetitions in time;
N_rep_set(1)={1, 2} number of repetitions in time;
N_rep_set(2)={1, 2, 4, 6} number of repetitions in time;
N_rep_set(3)={2, 4, 6, 8} number of repetitions in time;
N_rep_set(4)={4, 8, 12, 16} number of repetitions in time;
N_rep_set(5)={8, 16, 24, 32} number of repetitions in time;
N_rep_set(6)={16, 32, 48, 64} number of repetitions in time;
N_rep_set(7)={32, 64, 96, 128} number of repetitions in time;

The UE is configured with an N_rep_set(i) through RRC signaling. It may be beneficial to make sure there is overlap between two adjacent AL sets so that the base station 10 can use more or less repetition flexibly without RRC reconfiguration. Then the base station 10 only needs to resort to RRC reconfiguration if the UE channel conditions change substantially.

Search Space Definition for LC-PDCCH

The search space definition for LC-PDCCH is a combination of time and frequency parameters. There are at least two ways to define the search space for LC-PDCCH.

Independent Time-Frequency Definition

In this option, the time and frequency dimensions are defined separately and independently. The search space is then a combination of the two dimensions. Thus if there are 4 options of resource allocation within a given subframe (e.g., Table 3), and 4 options of number of repetitions in time (e.g., N_rep_set(2) to N_rep_set(7)), then there are a total of 4×4=16 blind decoding candidates.

This option has the benefit of simple definition and specification work. However, there are certain combinations that are not useful. For example, the combination of {L=2, N_rep=128} may be considered not useful, since it unnecessarily increases the UE latency. This also increases UE power consumption since the UE needs to stay active for 128 subframes for each LC-PDCCH monitoring. This is in comparison to the alternative of {L=24, N_rep=12}, where the UE only need to stay active for 12 subframes for each LC-PDCCH monitoring. If no LC-PDCCH is detected in the 12 subframes, then the UE can sleep till next LC-PDCCH monitoring opportunity.

Combined Time-Frequency Definition

In this option, the set of blind decoding candidates is a specific set of combinations of time-frequency elements. The time-domain and frequency-domain are not independent or fully combinable. The time-domain and frequency-domain combinations that are not useful are identified and removed, such that the set of blind decoding candidates the UE needs to search are limited.

One example of constructing the blind decoding candidates is below:

If RRC configures N_rep_set(0), where there is no repetition across subframe: Resource allocation within a subframe: Table 1, where there can be up to 16 candidates in a subframe; Repetition across subframe: N_rep_set(0)={1}.

If RRC configures N_rep_set(1), there are one (i.e., no repetition) or two repetition across subframes: Resource allocation within a subframe: Table 2, where there can be up to 8 candidates in a subframe; Repetition across subframes: N_rep_set(1)={1, 2}.

If RRC configures N_rep_set(2), where there are four different repetition across subframes: Resource allocation within a subframe: Table 3, where there can be up to 4 candidates in a subframe; Repetition across subframe: N_rep_set(2)={1, 2, 4, 6}.

If RRC configures N_rep_set(3)-N_rep_set(7), where there are four different repetition across subframes (note that when the available resources within a subframe is fully occupied by an LC-PDCCH candidate, as shown below, there are only 4 blind decoding candidates according to the time-dimension, not 16 for N_rep_set(0)-N_rep_set(2)): Resource allocation within a subframe: fully occupy the 6-PRB, i.e., the LC-PDCCH occupy $N_{ECCF,p,k}$ ECCEs, where $N_{ECCF,p,k}$ is the number of ECCEs in LC-PDCCH-PRB-set p of subframe k. Note that it can be further defined that $N_{RB}^{X_p}=6$ only, such that the LC-PDCCH fully occupy the 6-PRB group in the subframe configured to the UE. The possible number of repetitions across subframe is the 4 options in N_rep_set(i), i=3, 4, . . . , 7.

TABLE 1

LC-PDCCH candidates monitored by a UE in a subframe.

| | Number of LC-PDCCH candidates $M_p^{(L)}$ | | | | |
|---|---|---|---|---|---|
| $N_{RB}^{X}{}_{p}$ | L = 1 | L = 2 | L = 4 | L = 8 | L = 16 |
| 2 | 8 | 4 | 2 | 1 | 0 |
| 4 | 4 | 5 | 4 | 2 | 1 |
| 6 | 4 | 4 | 4 | 2 | 2 |

TABLE 2

LC-PDCCH candidates monitored by a UE in a subframe.

| | Number of LC-PDCCH candidates $M_p^{(L)}$ | | | | |
|---|---|---|---|---|---|
| $N_{RB}^{X}{}_{p}$ | L = 2 | L = 4 | L = 8 | L = 16 | L = 24 |
| 2 | 1 | 2 | 2 | 2 | 1 |
| 4 | 1 | 2 | 2 | 2 | 1 |
| 6 | 2 | 2 | 2 | 1 | 1 |

TABLE 3

LC-PDCCH candidates monitored by a UE in a subframe.

| | Number of LC-PDCCH candidates $M_p^{(L)}$ | | | | |
|---|---|---|---|---|---|
| $N_{RB}^{X}{}_{p}$ | L = 2 | L = 4 | L = 8 | L = 16 | L = 24 |
| 2 | 1 | 1 | 1 | 1 | 0 |
| 4 | 1 | 1 | 1 | 1 | 0 |
| 6 | 0 | 1 | 1 | 1 | 1 |

For example, the UE-specific LC-PDCCH search space (not the common LC-PDCCH search space) could consists of LC-PDCCH candidates with the LC-PDCCH repetition factors r1, r2, r3 and r4 for a given maximum value $r_{max}$ according to Table 4.

TABLE 4

Determination of repetition levels.

| $r_{max}$ | r1 | r2 | r3 | r4 |
|---|---|---|---|---|
| 1 | 1 | — | — | — |
| 2 | 1 | 2 | — | — |
| 4 | 1 | 2 | 4 | — |
| ≥8 | $r_{max}/8$ | $r_{max}/4$ | $r_{max}/2$ | $r_{max}$ |

Fallback

Ideally the base station 10 would configure the UE with just the right number of LC-PDCCH repetitions for the UE's current coverage situation. This way, the UE would avoid unnecessary power consumption (and associated battery drainage) since it only would need to keep its receiver on during the time required to receive the configured number of LC-PDCCH repetitions. If the channel conditions deteriorate, the base station 10 can reconfigure the UE with a higher number of LC-PDCCH repetitions.

However, if the RRC reconfiguration message itself needs to be scheduled with LC-PDCCH, there can be situations where the channel conditions have deteriorated too much before the base station 10 has had a chance to transmit the RRC reconfiguration message reliably to the UE. This could lead to a situation where the base station 10 cannot communicate with the UE and base station 10 has no means to resolve the situation unless there is some form of fallback operation at hand.

One possible fallback mechanism is to configure the UE in such a way that its LC-PDCCH search space also includes LC-PDCCH candidates associated with a larger repetition factor than the repetition factor representing its current coverage situation. In case the channel conditions deteriorate, the base station 10 will then have the ability to try accessing the UE using a larger LC-PDCCH repetition factor. The drawback with this approach is that the UE would need to keep its receiver on during a longer time and thereby increase its power consumption.

As an alternative fallback mechanism, the UE could be configured with a fallback LC-PDCCH search space that contains a higher number of repetitions but where the fallback LC-PDCCH search space is only applicable at well-defined points in time. Here is an example of how these "fallback occasions" could be defined:

Example of Periodic Pattern in Time:

Normal search space for 4 radio frames→fallback search space for 2 radio frame→Normal search space for 4 radio frames→fallback search space for 2 radio frame . . . .

The periodic fallback pattern can be fixed and defined in the specification, or configured with another RRC parameter.

Figure 1:
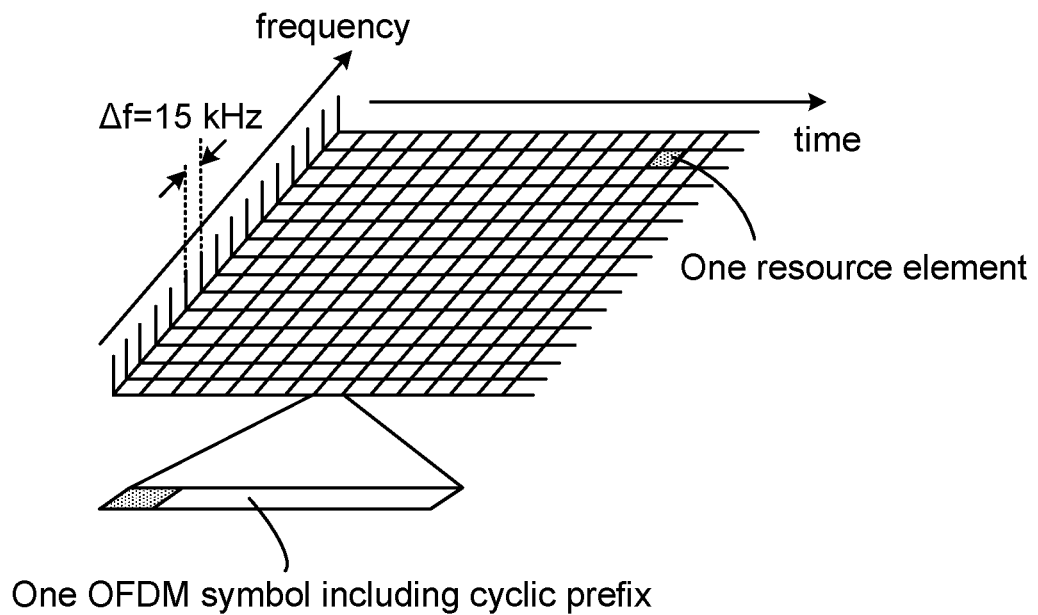
FIG. 1 is a time-frequency diagram of LTE downlink physical resource.
Figure 2:
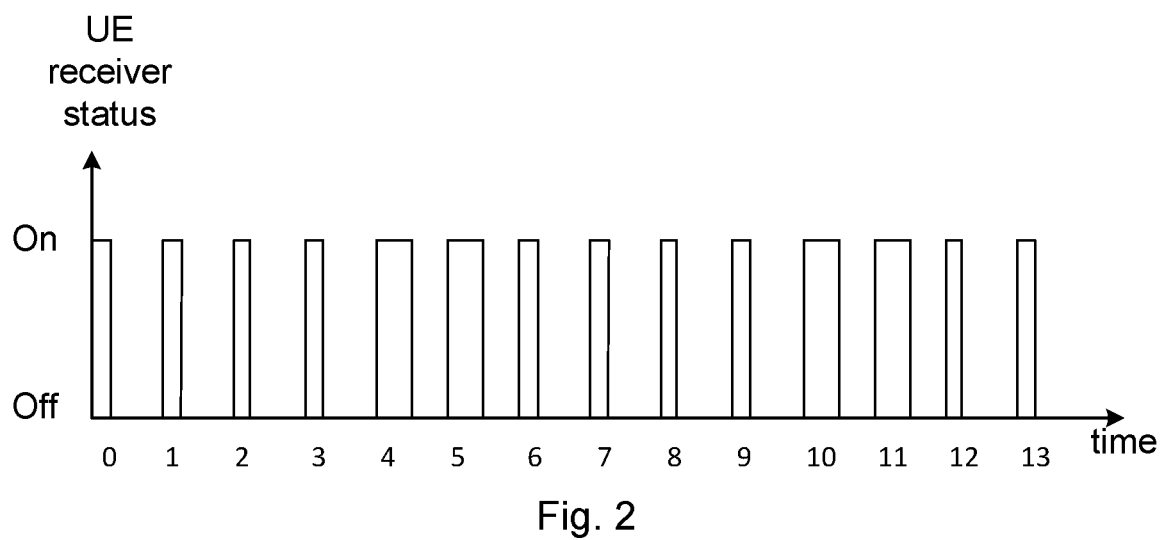
FIG. 2 a diagram depicting UE receiver on/off status with LC-PDCCH repetition factor pattern.

With this fallback approach, the UE would only need to apply the LC-PDCCH search space containing a higher number of repetitions in 2/(4+2)=⅓ of the total number of LC-PDCCH transmission opportunities. This principle is illustrated in FIG. 2. FIG. 2 depicts UE receiver on/off status with LC-PDCCH repetition factor pattern. In FIG. 2 it is assumed that there is one LC-PDCCH transmission opportunity every 10-ms frame and that the UE receiver needs to be on during n ms at every normal search space occasion and 2×n ms at every fallback search space occasion.

With the fallback approach described above, the range of repetition levels that RRC signal configures can be narrowed. For example, the N_rep_set disclosed above can be modified as below.

N_rep_set(0)={1} number of repetitions in time;
N_rep_set(1)={1, 2} number of repetitions in time;
N_rep_set(1)={2, 4} number of repetitions in time;
N_rep_set(3)={4, 8} number of repetitions in time;
N_rep_set(4)={8, 16} number of repetitions in time;
N_rep_set(5)={24, 32} number of repetitions in time;
N_rep_set(6)={48, 64} number of repetitions in time;
N_rep_set(7)={96, 628} number of repetitions in time;

If RRC signal configures N_rep_set(i), then:

For LC-PDCCH transmission opportunities with normal search space, the UE assumes search space associated with N_rep_set(i). For example, if i=3, UE assumes search space with 4 and 8 repetitions in time, respectively.

For LC-PDCCH transmission opportunities with fallback search space, the UE assumes search space associated with twice as many repetitions as those in N_rep_set(i). For example, if i=3, UE assumes search space with 8 and 16 repetitions in time, respectively.

Hardware and Software

Figure 3:
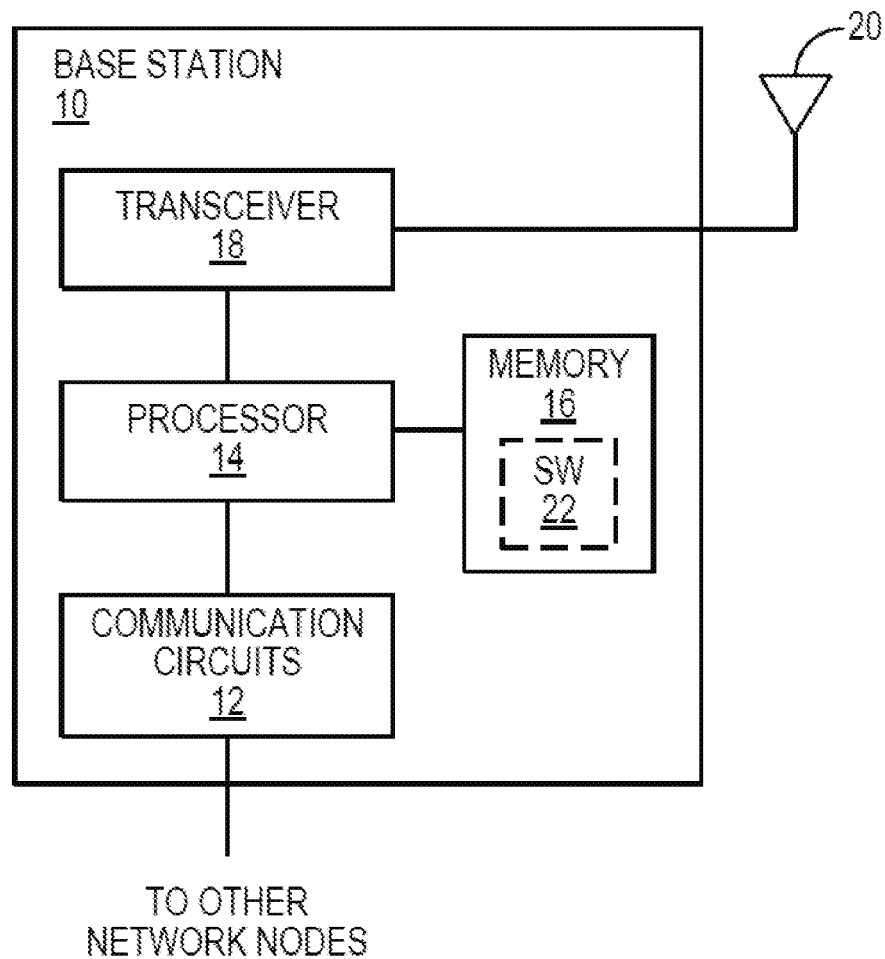
FIG. 3 is a functional block diagram of a base station.

FIG. 3 depicts a base station 10 operative in embodiments of the present inventive concept. As those of skill in the art are aware, a base station 10 is a network node providing wireless communication services to one or more UE in a geographic region known as a cell or sector. The base station 10 in LTE is called an e-NodeB or eNB; however the present inventive concept is not limited to LTE or eNBs. A base station 10 includes communication circuitry 12 operative to exchange data with other network nodes; a processor 14; memory 16; and radio circuitry, such as a transceiver 18, one or more antennas 20, and the like, to effect wireless communication across an air interface to one or more UE. According to embodiments of the present inventive concept, the memory 16 is operative to store, and the processor 14 operative to execute, software 22 (defined by a computer program and/or a computer program product) which when executed is operative to cause the base station 10 to perform methods and functions described herein.

Figure 4:
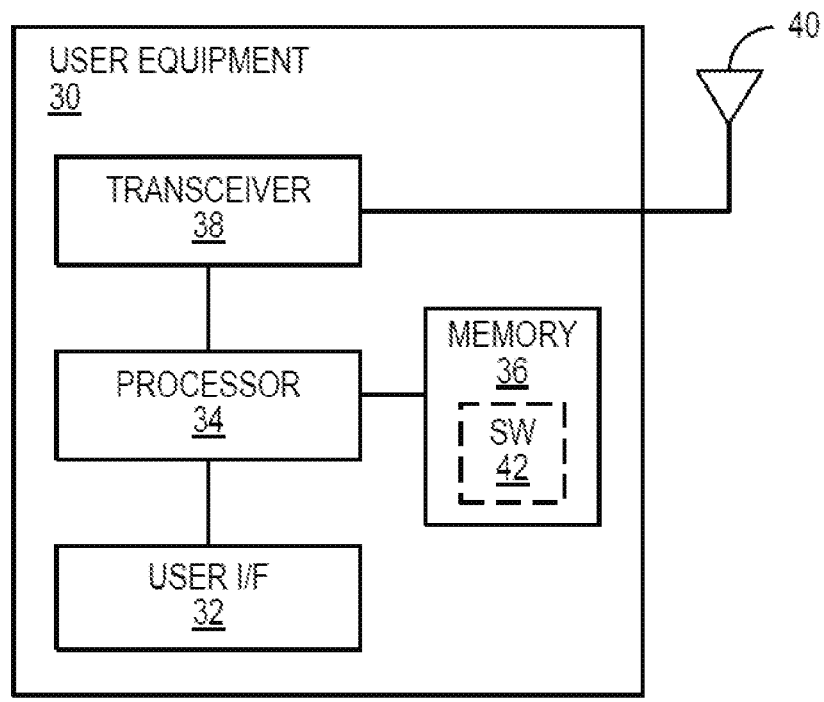
FIG. 4 is a functional block diagram of a UE.

FIG. 4 depicts a UE 30 operative in embodiments of the present inventive concept. As those of skill in the art are aware, a UE 30 is a device, which may be battery-powered and hence mobile, operative within a wireless communication network. A UE 30 may include a user interface 32 (display, touchscreen, keyboard or keypad, microphone, speaker, and the like); a processor 34; memory 36; and a radio circuitry, such as one or more transceivers 38, antennas 40, and the like, to effect wireless communication across an air interface to one or more base stations 10. In general, a UE 30 may additionally include features such as a camera, removable memory interface, short-range communication interface (Wi-Fi, Bluetooth, and the like), wired interface (USB), and the like (not shown in FIG. 4). On the other hand, a MTC UE may omit these additional features, and indeed may not include a user interface 32, and may have only minimal processing power, memory, and battery capacity/lifetime. According to embodiments of the present inventive concept, the memory 36 is operative to store, and the processor 34 operative to execute, software 42 (defined by a computer program and/or a computer program product) which when executed is operative to cause the UE 30 to perform methods and functions described herein In all embodiments, the processor 14, 34 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuitry may comprise one or more transceivers 18, 38 used to communicate with one or more other transceivers 18, 38 via a Radio Access Network according to one or more communication protocols known in the art or that may be developed, such as IEEE 802.xx, CDMA, WCDMA, GSM, LTE, UTRAN, WiMax, or the like. The transceiver 18, 38 implements transmitter and receiver functionality appropriate to the Radio Access Network links (e.g., frequency allocations and the like). The transmitter and receiver functions may share circuit components and/or software, or alternatively may be implemented separately.

In all embodiments, the communication circuitry 12 may comprise a receiver and transmitter interface used to communicate with one or more other nodes over a communication network according to one or more communication protocols known in the art or that may be developed, such as Ethernet, TCP/IP, SONET, ATM, or the like. The communication circuitry 12 implements receiver and transmitter functionality appropriate to communication network links (e.g., optical, electrical, and the like). The transmitter and receiver functions may share circuit components and/or software, or alternatively may be implemented separately.

Figure 5:
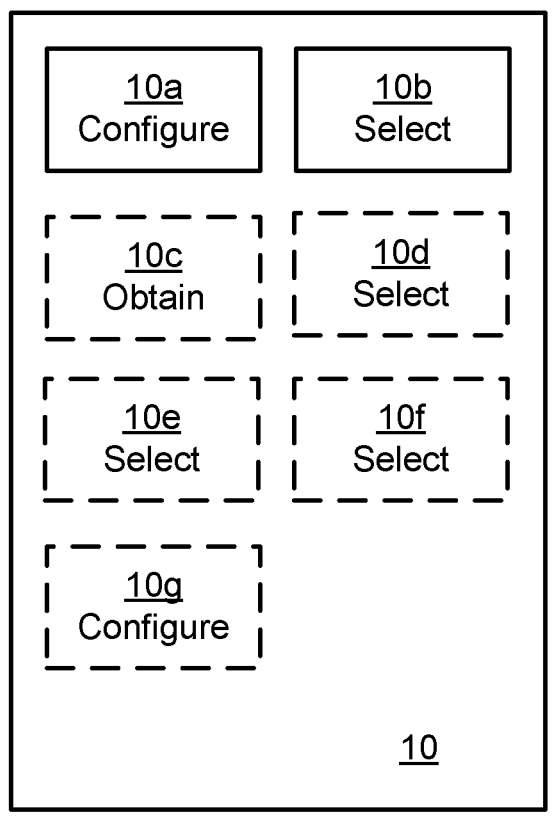
FIG. 5 is a functional module diagram of a base station.

FIG. 5 schematically illustrates, in terms of a number of functional modules, the components of a base station 10 according to an embodiment. The base station 10 comprises a number of functional modules; a configure module 10a configured to perform step S104, and a select module 10b configured to perform step S106. The base station 10 may further comprises a number of optional functional modules, such as any of an obtain module 10c configured to perform step S102, a select module 10d configured to perform step S108, a select module 10e configured to perform step S110, and a configure module 10f configured to perform step S112. In general terms, each functional module 10a-10f may be implemented in hardware or in software. Preferably, one or more or all functional modules 10a-10f may be implemented by the processor 14, possibly in cooperation with functional units 12, 16, 18, and the software 22. The processor 14 may thus be arranged to from the memory 16 fetch instructions as provided by a functional module 10a-10f and to execute these instructions, thereby performing any steps of the base station 10 as disclosed herein.

The functionality of the base station 10 can be implemented in a standalone device or as a part of at least one further device. For example, the functionality of the base station 10 can be implemented in a special purpose node of a radio access network or in an existing node of the radio access network. Alternatively, functionality of the base station 10 may be distributed between at least two devices, or nodes.

Thus, a first portion of the instructions performed by the base station 10 may be executed in a first device, and a second portion of the of the instructions performed by the base station 10 may be executed in a second device; the herein disclosed embodiments are not limited to any particular number of devices on which the instructions performed by the base station 10 may be executed. Hence, the methods according to the herein disclosed embodiments are suitable to be performed by a base station 10 residing in a cloud computational environment. Therefore, although a single processor 14 is illustrated in FIG. 3 the processor 14 may be distributed among a plurality of devices, or nodes. The same applies to the functional modules 10a-10f of FIG. 5 and the software 22.

Figure 6:
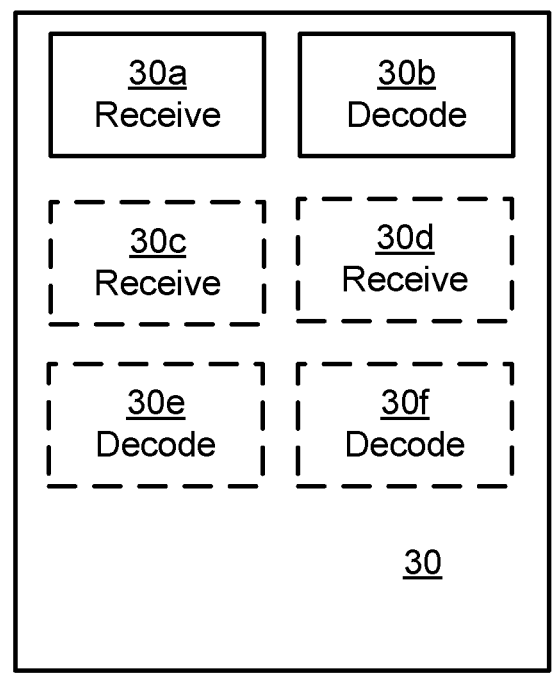
FIG. 6 is a functional module diagram of a UE.

FIG. 6 schematically illustrates, in terms of a number of functional modules, the components of a UE 30 according to an embodiment. The UE 30 comprises a number of functional modules; a receive module 30a configured to perform step S202, and a decode module 30b configured to perform step S208. The UE 30 may further comprises a number of optional functional modules, such as any of a receive module 30c configured to perform step S204, a receive module 30d configured to perform step S206, a decode module 30e configured to perform step S210, and a decode module 30f configured to perform step S210. In general terms, each functional module 30a-30f may be implemented in hardware or in software. Preferably, one or more or all functional modules 30a-30f may be implemented by the processor 34, possibly in cooperation with functional units 32, 36, 38, 42. The processor 34 may thus be arranged to from the memory 316 fetch instructions as provided by a functional module 30a-30f and to execute these instructions, thereby performing any steps of the UE 30 as disclosed herein.

According to some aspects there is provided a system for configuring a UE 30. The system comprises a UE 30 for being configured (i.e., for obtaining configuration) as herein disclosed and a base station 10 for configuring the UE 30 as herein disclosed.

CONCLUSION

Advantageously these methods, these base stations, these UEs, this systems, and these computer programs provides efficient configuration of the UE.

Embodiments of the present inventive concept present numerous advantages over the prior art. The methods allow a narrow-band MTC UE to operate in a legacy LTE system with wider system bandwidth, and be able to obtain configuration of LC-PDCCH at the initialization stage.

The present inventive concept may, of course, be carried out in other ways than those specifically set forth herein without departing from essential characteristics of the inventive concept. The present embodiments are to be considered in all respects as illustrative and not restrictive.

| Abbreviation | Description |
| --- | --- |
| 3GPP | 3rd Generation Partnership Project |
| AL | Aggregation Level |
| ASIC | Application-specific integrated circuit |
| ATM | Asynchronous Transfer Mode |
| CDMA | Code division multiple access |
| DCI | Downlink control information |
| DFT | Discrete Fourier Transform |
| eMTC | Enhanced MTC |
| eNB | Evolved Node-B |
| ECCE | Enhanced Control Channel Element |
| EPDCCH | Enhanced PDCCH |

-continued

| Abbreviation | Description |
|---|---|
| FPGA | Field-programmable gate array |
| GSM | Global System for Mobile Communications |
| IoT | Internet of Things |
| LC-PDCCH | Low complexity PDCCH |
| LTE | Long term evolution |
| MPDCCH | MTC PDCCH |
| MTC | Machine-Type Communications |
| M2M | Machine to Machine |
| NB-IoT | Narrowband IoT |
| OFDM | Orthogonal frequency-division multiplexing |
| NPDCCH | NB-IoT PDCCH |
| PDCCH | Physical downlink control channel |
| PRB | Physical Resource Block |
| RF | Radio Frequency |
| RRC | Radio resource control |
| SC-FDMA | Single carrier frequency division multiple access |
| SONET | Synchronous Optical Networking |
| TCP/IP | Transmission Control Protocol/Internet Protocol |
| UE | User Equipment |
| UL | Uplink |
| UTRAN | Universal Terrestrial Radio Access Network |
| WCDMA | Wideband CDMA |

REFERENCES

[1] 3GPP TS 36.211 V12.4.0, 3rd Generation Partnership Project; Technical Specification Group Radio Access Network; Evolved Universal Terrestrial Radio Access (E-UTRA); Physical channels and modulation (Release 12)
[2] 3GPP TS 36.213 V12.4.0, 3rd Generation Partnership Project; Technical Specification Group Radio Access Network; Evolved Universal Terrestrial Radio Access (E-UTRA); Physical layer procedures (Release 12)
[3] 3GPP TS 36.331 V12.4.1, 3rd Generation Partnership Project; Technical Specification Group Radio Access Network; Evolved Universal Terrestrial Radio Access (E-UTRA); Radio Resource Control (RRC); Protocol specification (Release 12)
[4] 3GPP TR 36.888 v12.0.0, Study on provision of low-cost Machine-Type Communications (MTC) User Equipments (UEs) based on LTE (Release 12)
[5] 3GPP Tdoc RP-141660, Work Item Description: Further LTE Physical Layer Enhancements for MTC, Ericsson, Nokia Networks
Additional Background Material:
3GPP TSG RAN WG1 Meeting #80, Athens, Discussions on downlink control channel for Rel-113 MTC UE.
R1-141730, "Final Report of 3GPP TSG RAN WGI#76 v1.0.0," MCC
R1-140240, "Analysis on (E)DPCCH search space design in coverage enhancement mode," MediaTek, Inc.

The invention claimed is:

1. A base station for configuring a user equipment (UE), the base station comprising a processor, the processor being configured to cause the base station to:
configure the UE with a low complexity physical downlink control channel (LC-PDCCH), repetition level range selected from an ordered set of LC-PDCCH repetition level ranges using radio resource control (RRC), signaling;
configure the UE in a frequency domain by instructing the UE to operate on two, four, or six pairs of physical resource blocks (PRBs), within a group of 6 PRBs in a subframe of the LC-PDCCH; and
select a LC-PDCCH repetition level from the configured LC-PDCCH repetition level range for a transport block transmission to the UE.

2. The base station according to claim 1, wherein adjacent LC-PDCCH repetition level ranges in the set of LC-PDCCH repetition level ranges are partly overlapping.

3. The base station according to claim 1, wherein location of the PRBs within the group is indicated in the configuration by at most 2 bits.

4. The base station according to claim 1, wherein the base station configures the LC-PDCCH repetition level range and configures the UE in the frequency domain either separately and independently or jointly.

5. The base station according to claim 1, the processor further being configured to cause the base station to:
obtain an indication of current channel conditions, wherein the current channel conditions correspond to an LC-PDCCH repetition threshold level; and
select the LC-PDCCH repetition level based on the indication of current channel conditions such that the LC-PDCCH repetition level is higher than the LC-PDCCH repetition threshold level.

6. The base station according to claim 1, the processor further being configured to cause the base station to:
select the LC-PDCCH repetition level such that the LC-PDCCH repetition level involves a first period comprising a first number of repetitions and a second period comprising a second number of repetitions, and wherein the repetitions in the second period are more densely placed than in the first period.

7. A user equipment, (UE), for obtaining configuration, the UE comprising a processor configured to cause the UE to:
receive configuration information for a low complexity physical downlink control channel, (LC-PDCCH), repetition level range selected from an ordered set of LC-PDCCH repetition level ranges using radio resource control, (RRC), signaling from a base station;
receive instructions from the base station for configuring the UE in frequency domain by instructing the UE to operate on two, four, or six pairs of physical resource blocks, (PRBs), within a group of 6 PRBs in a subframe of the LC-PDCCH; and
attempt decoding the LC-PDCCH according to at least one value in the configured LC-PDCCH repetition level range, wherein to attempt the decoding, the processor is configured to cause the UE to attempt decoding two, four, or six pairs of PRBs within the group of 6 PRBs in a subframe of the LC-PDCCH according to the instructions.

8. The UE according to claim 7, the processor further being configured to cause the UE to, when the decoding attempt was unsuccessful and there is at least one higher value in the configured LC-PDCCH repetition level range:
attempt decoding the LC-PDCCH according to at least one of said at least one higher value in the LC-PDCCH repetition level range.

9. The UE according to claim 7, the processor further being configured to cause the UE to:
receive an indication indicating the at least one value of the LC-PDCCH repetition level range.

10. The UE according to claim 7, wherein adjacent LC-PDCCH repetition levels in the set of LC-PDCCH repetition level ranges are partly overlapping.

11. The UE according to claim 7, wherein location of the PRBs within the group is indicated in the instructions by at most 2 bits.

12. The UE according to claim 7, wherein the LC-PDCCH repetition level involves a first period comprising a first number of repetitions and a second period comprising a second number of repetitions, and wherein the repetitions in the second period are more densely placed than in the first period.

13. A system for configuring a user equipment, (UE), the system comprising the UE and a base station, wherein
the base station is configured to:
configure the UE with a low complexity physical downlink control channel, (LC-PDCCH), repetition level range selected from an ordered set of LC-PDCCH repetition level ranges using radio resource control, (RRC), signaling; and
select a LC-PDCCH repetition level from the configured LC-PDCCH repetition level range for a transport block transmission to the UE; and
the UE is configured to:
receive the LC-PDCCH repetition level range as configuration information from the base station and using RRC signaling;
receive instructions from the base station for configuring the UE in a frequency domain by instructing the UE to operate on two, four, or six pairs of physical resource blocks, (PRBs), within a group of 6 PRBs in a subframe of the LC-PDCCH; and
attempt decoding the LC-PDCCH according to at least one value in the configured LC-PDCCH repetition level range, wherein to attempt the decoding, the UE is configured to attempt decoding two, four, or six pairs of PRBs within the group of 6 PRBs in a subframe of the LC-PDCCH according to the instructions.

14. A base station for configuring a user equipment, (UE), the base station comprising:
configuration circuitry configured to:
configure the UE with a low complexity physical downlink control channel, (LC-PDCCH), repetition level range selected from an ordered set of LC-PDCCH repetition level ranges using radio resource control, (RRC), signaling; and
configure the UE in a frequency domain by instructing the UE to operate on two, four, or six pairs of physical resource blocks, (PRBs), within a group of 6 PRBs in a subframe of the LC-PDCCH; and
selection circuitry configured to select a LC-PDCCH repetition level from the configured LC-PDCCH repetition level range for a transport block transmission to the UE.

15. A user equipment, (UE), for obtaining configuration, the UE comprising:
receive circuitry configured to:
receive configuration information for a low complexity physical downlink control channel, (LC-PDCCH), repetition level range selected from an ordered set of LC-PDCCH repetition level ranges using radio resource control, (RRC), signaling from a base station; and
receive instructions from the base station for configuring the UE in a frequency domain by instructing the UE to operate on two, four, or six pairs of physical resource blocks, (PRBs), within a group of 6 PRBs in a subframe of the LC-PDCCH; and
decode circuitry configured to attempt decoding the LC-PDCCH according to at least one value in the configured LC-PDCCH repetition level range, wherein to attempt the decoding, the decode circuitry is configured to attempt decoding two, four, or six pairs of PRBs within the group of 6 PRBs in a subframe of the LC-PDCCH according to the instructions.

16. A method for configuring a user equipment, (UE), the method being performed by a base station, the method comprising:
configuring the UE with a low complexity physical downlink control channel, (LC-PDCCH), repetition level range selected from an ordered set of LC-PDCCH repetition level ranges using radio resource control, (RRC), signaling;
configuring the UE in a frequency domain by instructing the UE to operate on two, four, or six pairs of physical resource blocks, (PRBs), within a group of 6 PRBs in a subframe of the LC-PDCCH; and
selecting a LC-PDCCH repetition level from the configured LC-PDCCH repetition level range for a transport block transmission to the UE.

17. The method according to claim 16, further comprising:
obtaining an indication of current channel conditions, wherein the current channel conditions correspond to an LC-PDCCH repetition threshold level; and
selecting the LC-PDCCH repetition level based on the indication of current channel conditions such that the LC-PDCCH repetition level is higher than the LC-PDCCH repetition threshold level.

18. The method according to claim 16, further comprising:
selecting the LC-PDCCH repetition level such that the LC-PDCCH repetition level involves a first period comprising a first number of repetitions and a second period comprising a second number of repetitions, and wherein the repetitions in the second period are more densely placed than in the first period.

19. A method for obtaining configuration of a user equipment, (UE), the method being performed by the UE, the method comprising:
receiving configuration information for a low complexity physical downlink control channel, (LC-PDCCH), repetition level range selected from an ordered set of LC-PDCCH repetition level ranges using radio resource control, (RRC), signaling from a base station;
receiving instructions from the base station for configuring the UE in frequency domain by instructing the UE to operate on two, four, or six pairs of physical resource blocks, (PRBs), within a group of 6 PRBs in a subframe of the LC-PDCCH; and
attempting decoding the LC-PDCCH according to at least one value in the configured LC-PDCCH repetition level range, wherein the attempting comprises attempting decoding two, four, or six pairs of PRBs within the group of 6 PRBs in a subframe of the LC-PDCCH according to the instructions.

20. The method according to claim 19, further comprising, when the decoding attempt was unsuccessful and there is at least one higher value in the configured LC-PDCCH repetition level range:
attempting decoding the LC-PDCCH according to at least one of said at least one higher value in the LC-PDCCH repetition level range.

21. The method according to claim 19, further comprising:
receiving an indication indicating the at least one value of the LC-PDCCH repetition level range.

22. A non-transitory computer readable medium operative to store a computer program for configuring a user equipment, (UE), the computer program comprising computer code which, when run on a processor of a base station, causes the base station to:
- configure the UE with a low complexity physical downlink control channel, (LC-PDCCH), repetition level range selected from an ordered set of LC-PDCCH repetition level ranges using radio resource control, (RRC), signaling;
- configure the UE in a frequency domain by instructing the UE to operate on two, four, or six pairs of physical resource blocks, (PRBs), within a group of 6 PRBs in a subframe of the LC-PDCCH; and
- select a LC-PDCCH repetition level from the configured LC-PDCCH repetition level range for a transport block transmission to the UE.

23. A non-transitory computer readable medium operative to store a computer program for obtaining configuration of a user equipment, (UE), the computer program comprising computer code which, when run on a processor of the UE, causes the UE to:
- receive configuration information for a low complexity physical downlink control channel, (LC-PDCCH), repetition level range selected from an ordered set of LC-PDCCH repetition level ranges using radio resource control, (RRC), signaling from a base station;
- receive instructions from the base station for configuring the UE in frequency domain by instructing the UE to operate on two, four, or six pairs of physical resource blocks, (PRBs), within a group of 6 PRBs in a subframe of the LC-PDCCH; and
- attempt decoding the LC-PDCCH according to at least one value in the configured LC-PDCCH repetition level range, wherein the attempting comprises attempting decoding two, four, or six pairs of PRBs within the group of 6 PRBs in a subframe of the LC-PDCCH according to the instructions.

* * * * *

UNITED STATES PATENT AND TRADEMARK OFFICE
CERTIFICATE OF CORRECTION

PATENT NO. : 10,791,022 B2
APPLICATION NO. : 15/031413
DATED : September 29, 2020
INVENTOR(S) : Blankenship et al.

It is certified that error appears in the above-identified patent and that said Letters Patent is hereby corrected as shown below:

On the Title Page

On Page 2, in item (56), under "OTHER PUBLICATIONS", in Column 2, Line 44, delete "Nec," and insert -- NEC, --, therefor.

In the Specification

In Column 1, Line 49, delete "one or to two" and insert -- one or two --, therefor.

In Column 4, Line 9, delete "this systems," and insert -- these systems, --, therefor.

In Column 4, Line 43, delete "FIG. 2 a" and insert -- FIG. 2 is a --, therefor.

In Column 4, Line 49, delete "and to" and insert -- and 10 --, therefor.

In Column 5, Line 60, delete "level rang)," and insert -- level range), --, therefor.

In Column 6, Line 23, delete "S108:" and insert -- S110: --, therefor.

In Column 6, Line 64, delete "vase station 10," and insert -- base station 10, --, therefor.

In Column 10, Line 22, delete "$N_{ECCF,p,k}$" and insert -- $N_{ECCE,p,k}$ --, therefor.

In Column 10, Line 23, delete "$N_{ECCF,p,k}$" and insert -- $N_{ECCE,p,k}$ --, therefor.

In Column 10, in Table 1, Line 36, delete "$N_{RB}{}^{X_p}$" and insert -- $N_{RB}^{X_p}$ --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,791,022 B2

In Column 10, in Table 2, Line 48, delete "$N_{RB}{}^{X_p}$" and insert -- $N_{RB}^{X_p}$ --, therefor.

In Column 10, in Table 3, Line 4, delete "$N_{RB}{}^{X_p}$" and insert -- $N_{RB}^{X_p}$ --, therefor.

In Column 12, Line 7, delete "N_rep_set(1)={2,4}" and insert -- N_rep_set(2)={2,4} --, therefor.

In Column 12, Line 12, delete "N_rep_set(7)={96, 628}" and insert -- N_rep_set(7)={96, 128} --, therefor.

In Column 13, Line 48, delete "configure module 10f" and insert -- configure module 10g --, therefor.

In Column 14, Line 30, delete "from the memory 316" and insert -- form the memory 36 --, therefor.

In Column 14, Line 43, delete "this systems," and insert -- these systems, --, therefor.

In Column 15, Line 52, delete "(E)DPCCH" and insert -- (E)PDCCH --, therefor.